(12) United States Patent
Sakai et al.

(10) Patent No.: US 9,333,932 B2
(45) Date of Patent: May 10, 2016

(54) AIR BAG AND FOLDING METHOD THEREOF

(71) Applicant: NIHON PLAST CO., LTD., Fujinomiya-shi, Shizuoka (JP)

(72) Inventors: Naoto Sakai, Numazu (JP); Akito Urushibata, Shizuoka (JP); Chiari Saito, Fujinomiya (JP); Hidenobu Suzuki, Fuji (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 13/721,300

(22) Filed: Dec. 20, 2012

(65) Prior Publication Data

US 2013/0241184 A1 Sep. 19, 2013

(30) Foreign Application Priority Data

Mar. 13, 2012 (JP) .................................. 2012-055333

(51) Int. Cl.
| | |
|---|---|
| *B60R 21/20* | (2011.01) |
| *B31F 1/00* | (2006.01) |
| *B60R 21/205* | (2011.01) |
| *B60R 21/2346* | (2011.01) |
| *B60R 21/237* | (2006.01) |

(52) U.S. Cl.
CPC .............. *B60R 21/20* (2013.01); *B31F 1/0003* (2013.01); *B60R 21/205* (2013.01); *B60R 21/237* (2013.01); *B60R 21/2346* (2013.01)

(58) Field of Classification Search
CPC B60R 21/237; B60R 21/205; B60R 21/2346; B60R 21/20

USPC ....................................................... 280/743.1
See application file for complete search history.

(56) References Cited

U.S. PATENT DOCUMENTS

| | | | | |
|---|---|---|---|---|
| 5,636,861 | A * | 6/1997 | Orsulak et al. ............. | 280/730.1 |
| 5,746,447 | A * | 5/1998 | Dyer et al. ................. | 280/743.2 |
| 5,873,598 | A * | 2/1999 | Yoshioka et al. ............ | 280/740 |
| 5,884,939 | A * | 3/1999 | Yamaji et al. .............. | 280/743.1 |
| 5,957,486 | A * | 9/1999 | Taguchi et al. ............. | 280/729 |
| 6,029,996 | A * | 2/2000 | Yoshioka et al. ............ | 280/740 |
| 6,196,585 | B1 * | 3/2001 | Igawa ....................... | 280/743.1 |
| 6,244,624 | B1 | 6/2001 | Kumagai | |
| 6,619,691 | B1 * | 9/2003 | Igawa ........................ | 280/732 |
| 6,767,030 | B2 * | 7/2004 | Yamaji et al. ............... | 280/740 |
| 6,832,779 | B2 * | 12/2004 | Tajima et al. .............. | 280/743.1 |

(Continued)

FOREIGN PATENT DOCUMENTS

| | | | |
|---|---|---|---|
| JP | 11-091471 A | 4/1999 | |
| JP | 2001225710 A * | 8/2001 | .............. B60R 21/16 |

*Primary Examiner* — Ruth Ilan
*Assistant Examiner* — Joselynn Y Sliteris
(74) *Attorney, Agent, or Firm* — Sughrue Mion, PLLC

(57) ABSTRACT

An air bag includes: a gas introduction opening portion; and a bag-shaped air bag main body portion; the air bag main body portion in the folded state including a first accumulated portion folded in a state where at least a portion of the first accumulated portion is turned over on a counter-occupant side toward the gas introduction opening, and a second accumulated portion which includes a face confronting portion confronting a face of the occupant in a normal position, and which is folded in a state where the face confronting portion is superimposed on the first accumulated portion so that the inflation gas introduced from the gas introduction opening directly flows into the face confronting portion.

9 Claims, 12 Drawing Sheets

(56) References Cited

U.S. PATENT DOCUMENTS

| | | | |
|---|---|---|---|
| 7,118,129 B2 * | 10/2006 | Yamaji et al. | 280/743.1 |
| 7,926,844 B2 * | 4/2011 | Williams et al. | 280/743.1 |
| 8,491,006 B2 * | 7/2013 | Nagai | 280/743.2 |
| 2003/0197358 A1 | 10/2003 | Hawthorn et al. | |
| 2004/0135352 A1 | 7/2004 | Igawa et al. | |
| 2004/0251669 A1 * | 12/2004 | Fischer et al. | 280/743.1 |
| 2008/0143086 A1 | 6/2008 | Higuchi | |
| 2011/0266781 A1 * | 11/2011 | Nagai | 280/736 |

* cited by examiner

AIR BAG AND FOLDING METHOD THEREOF

BACKGROUND OF THE INVENTION

This invention relates to an air bag arranged to inflate and deploy from a folded state by a supplied inflation gas to protect an occupant, and a folding method of the air bag.

A Japanese Patent Application Publication No. 11-91471 discloses an air bag apparatus for a passenger seat which is provided to an instrument panel portion of a vehicle. This air bag apparatus includes an inflator arranged to supply an inflation gas, and an air bag including a bag-shaped air bag main body portion folded into a predetermined shape. The air bag apparatus is arranged to inflate and deploy the air bag main body portion forward of an occupant seated on the passenger seat at a collision of the vehicle, by supply of an inflation gas from the inflator, so as to relive the impact acted to the occupant.

In the above-described air bag apparatus, the air bag main body portion is folded by a predetermined width in a vehicle widthwise direction. Folding portions are formed, respectively, on a front side which is the instrument panel portion side of an introduction opening of the inflation gas from the inflator, that is, a counter-occupant side, and on a rear side which is an occupant side (of the introduction opening). The folding portion on the occupant side is folded into a rolled shape on the introduction opening side to confront the introduction opening. Moreover, the folding portion on the counter-occupant side is folded into a bellows shape (accordion shape) to be positioned on the folding portion on the occupant side which is folded into the rolled shape. The thus-folded member is received within an air bag cover member.

SUMMARY OF THE INVENTION

However, in the above-described air bag, the inflation gas from the inflator is preferentially introduced into the folding portion on the occupant side from the introduction opening. Accordingly, the folding portion on the occupant side is deployed prior to the folding portion on the front side. Therefore, it is difficult to address an OOP (Out of Position) state in which a chest portion, or a head portion of the occupant is positioned near the air bag apparatus, that is, the instrument panel portion. In this way, in the conventional apparatus, there is a problem that it is not possible to readily attain a desired deployment characteristic.

It is, therefore, an object of the present invention to provide an air bag and a folding method of the air bag which are devised to solve the above-described problems, and to obtain a preferable deployment characteristic, irrespective of a position of an occupant.

According to one aspect of the present invention, an air bag comprises: a gas introduction opening portion through which an inflation gas is introduced; and a bag-shaped air bag main body portion arranged to be inflated and deployed from a folded state by the inflation gas introduced from the gas introduction opening to protect an occupant; the air bag main body portion in the folded state including a first accumulated portion folded in a state where at least a portion of the first accumulated portion is turned over on a counter-occupant side toward the gas introduction opening, and a second accumulated portion which includes a face confronting portion confronting a face of the occupant in a normal position, and which is folded in a state where the face confronting portion is superimposed on the first accumulated portion so that the inflation gas introduced from the gas introduction opening directly flows into the face confronting portion.

According to another aspect of the invention, a folding method of an air bag including a gas introduction opening through which an inflation gas is introduced, and a bag-shaped air bag main body portion arranged to be inflated and deployed from a folded state by the inflation gas introduced from the gas introduction opening to protect an occupant, the folding method comprises: forming a first folding portion and a second folding portion at positions to sandwich the gas introduction opening in a direction crossing the thickness direction, by folding the air bag main body portion in a thickness direction, forming a first accumulated portion by folding the first folding portion to turn over at least a portion of the first folding portion on a counter-occupant side toward the gas introduction opening, and forming a second accumulated portion by folding the second folding portion so that a face confronting portion confronting a face of the occupant in a normal position in the deployment state is superimposed on the first accumulated portion so that the inflation gas introduced from the gas introduction opening directly flows into the face confronting portion.

DETAILED DESCRIPTION OF THE INVENTION

Hereinafter, an air bag according to a first embodiment of the present invention will be illustrated with reference to the drawings.

Figure 4:
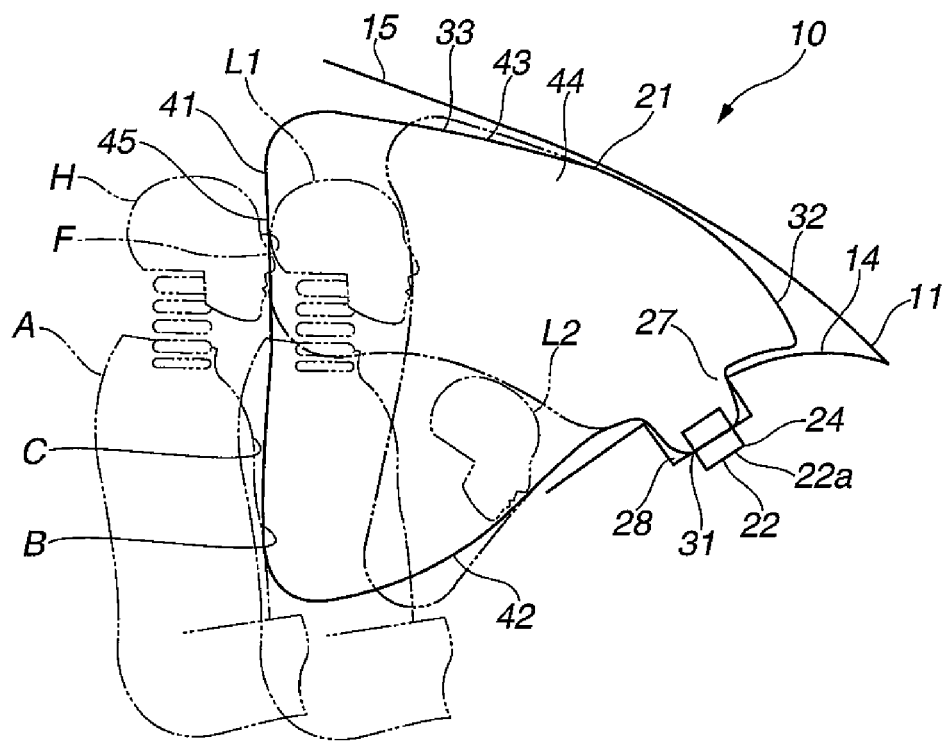
FIG. 4 is an illustrative view showing a deployed state of the air bag of FIG. 1.

In FIG. 4, a numeral 10 is an air bag apparatus. This air bag apparatus 10 is disposed inside an instrument panel portion 14 which is an installed portion (mounted portion) that is positioned forward of a passenger seat of an automobile 11 which is a vehicle that is a movable body, that is, an occupant A of the passenger seat. That is, this air bag apparatus 10 is an air bag apparatus for the passenger seat. Hereinafter, forward and rearward directions, both side directions, and upward and downward directions are illustrated with reference to a moving direction of the vehicle 11 in a state where the air bag apparatus 10 is attached to the vehicle 11. Moreover, in the drawings, the occupant A is a dummy which is, for example, a dummy (AM50) imitating a relatively large man.

For example, the instrument panel portion 14 has a curved shape which is slightly inclined in the downward direction toward the rear side, that is, toward the passenger seat side. The air bag apparatus 10 is threadably fixed to a steering member (not shown) which is a mounted member disposed within this instrument panel portion 14, in an inclined state in which a front surface side of the air bag apparatus 10 is inclined (in a downward direction) from an upper portion toward a slightly rearward side, that is, toward the occupant A's side. Moreover, a front glass 15 which is a windshield is disposed above the instrument panel 14. The front glass 15 is inclined from a front lower portion to a rear upper portion.

The air bag apparatus 10 is an air bag module including an air bag 21 constituted by a base fabric, an inflator 22 arranged to supply a gas to this air bag 21, a case member 24 to which the air bag 21 and the inflator 22 are mounted, a retainer plate 25, a cover member (not shown) covering the air bag 21 before the deployment of the air bag 21, a controller (not shown) configured to control an operation of the inflator 22, and so on.

The case member 24 is formed into a substantially box shape. The case member 24 includes a rectangular protrusion opening 27 which is an opening portion positioned at an upper portion of the case member 24 that directs the front side or the front glass 15, and an air bag receiving portion 28 which is an inside portion of the case member 24, and which receives the folded air bag 21. This protrusion opening 27 is covered by the cover member in a normal state.

Moreover, for example, a pair of the inflators 22 is used together. Each of the inflators 22 includes a main body portion 22a which has a disc shape; a flange portion which has a rectangular plate shape, and which protrudes from a substantially middle position of the main body portion 22a in a height direction of the main body portion 22a; and through holes which are mounting holes positioned at four corner portions of the flange portion. Furthermore, the each of the inflators 22 includes a plurality of gas injection openings which are formed on an outer circumference surface of the main body portion 22a, at an upper portion of the main body portion 22a, that is, at a position above the flange portion. Moreover, an igniter and propellant are received within the main body portion 22a. The igniter fires the propellant in response to an electric signal transmitted from the controller through a connector connected with a bottom portion, so that the inflation gas G is rapidly supplied from the gas injection openings. Each of the inflators 22 is mounted to the bottom portion of the case member 24 in a state where the main body portion 22a having the gas injection openings is inserted within the air bag 21. Besides, this inflator 22 may have various shapes. For example, the main body portion having a cylindrical shape may be disposed within the air bag 21.

The retainer plate 25 includes a retainer main body 25a which has a frame shape, and mounting bolts (not shown) protruding from this retainer main body 25a.

Moreover, the cover member is made of a resin. The cover member is a member integral with the instrument panel portion 14, or a member different from the instrument panel portion 14. The cover member includes tear lines which are thinner than the other portions, and which are readily broken.

The air bag 21 is formed by a base fabric or by combining a plurality of the base fabrics. This air bag 21 includes a gas introduction opening 31 which is an inflator mounted opening to which the inflators 22 are mounted. This air bag 21 includes an air bag main body portion 34 which has a bag shape that has a substantially constant width, and a thickness which is increased from a base end portion 32 that is one end portion near the gas introduction opening 31, to a tip end portion 33 that is the other end portion. This air bag main body portion 34 includes a front surface portion 41 confronting the occupant A at the deployment, a lower surface portion 42 extending toward and along the instrument panel portion 14 at the deployment, an upper surface portion 43 extending toward and along the front glass 15 at the deployment, and side surface portions 44 and 44 positioned on both sides of the front surface portion 41, the lower surface portion 42, and the upper surface portion 43. The front surface portion 41, the lower surface portion 42, the upper surface portion 43, and the side surface portions 44 and 44 of the air bag main body portion 34 are continuously formed. That is, in the air bag main body portion 34, the lower surface portion 42 and the upper surface portion 43 are continuous with each other in the base end portion 32. Moreover, the lower surface portion 42 is continuous with a lower edge portion of the front surface portion 41. The upper surface portion 43 is continuous with an upper edge portion of the front surface portion 41. Furthermore, the side surface portions 44 and 44 are continuous with the both side portions of the front surface portion 41, the lower surface portion 42, and the upper surface portion 43. Moreover, an upper portion of the front surface portion 41 is a face confronting portion 45 which is a face contact position at which the air bag 21 confronts and contacts a face F of the occupant A at a normal position.

Moreover, the gas introduction opening 31 is a hole according to a shape of the inflator 22. Around the gas introduction opening 31, there are formed a plurality of mounting holes (not shown) into which the mounting bolts of the retainer plate 25 are inserted.

This air bag 21 is folded into a predetermined shape described later. The portion of the gas introduction openings of the inflator 22 is inserted through the gas introduction opening 31. This air bag 21 is received within the air bag receiving portion 28 of the case member 24 in a state where the retainer main body 25a of the retainer plate 25 presses the portion around this gas introduction opening 31 against the bottom portion of the case member 24. Then, in a state where nuts (not shown) are screwed and tightened on the mounting bolts of the retainer plate 25, the air bag 21, the case member 24, and the inflator 22 are tightened together with each other and fixed between the retainer main body 25a and the nuts.

In the thus-constructed air bag apparatus 10, the controller actuates the inflator 22 at collision of the vehicle so that the inflator 22 injects the inflation gas G. Then, this air bag 21 is inflated and deployed in accordance with the supply of the gas, so as to break the tear lines of the cover member. Consequently, this air bag 21 protrudes from the protrusion opening 27 toward the front surface side. Moreover, this air bag 21 is inflated and deployed by movement (behavior) described below, so that the air bag 21 expands forward of the occupant A seated on the passenger seat, so as to protect the occupant A from the impact of the collision.

Next, the folding shape and the folding process of this air bag 21 are illustrated.

Figure 2A:
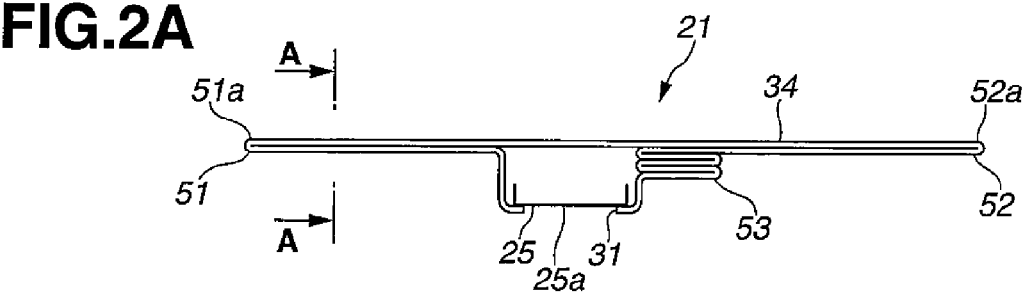
FIGS. 2A-2E are illustrative views showing a folding process of the air bag in the order from FIG. 2A to FIG. 2E.
Figure 3:
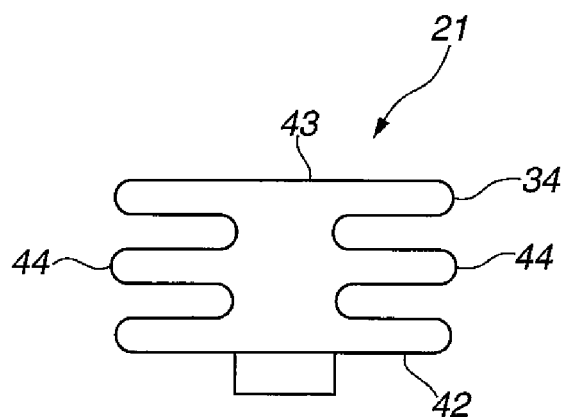
FIG. 3 is a schematically illustrative sectional view taken along a section line A-A of FIG. 2A.

First, the retainer plate 25 is inserted within the air bag main body portion 34 of the air bag 21. The mounting bolts of the retainer plate 25 are pulled out to the outside. The air bag main body portion 34 is brought to the deployment state. From this, in a first folding process, as shown in FIG. 2A, the air bag main body portion 34 is folded in the thickness direction by pressing a substantially central portion of the front surface portion 41 (FIG. 4) toward the gas introduction opening 31's side while the both side surface portions 44 and 44 are folded inwardly (FIG. 3). Consequently, there are formed a first folding portion 51 which is a rear folding portion, and a second folding portion 52 which is a front folding portion. The first folding portion 51 and the second folding portion 52 are positioned, respectively, on a rear side and a front side of the gas introduction opening 31 to sandwich the gas introduction opening 31. Moreover, there is formed an adjustment accumulated portion 53 which is an adjustment folding portion formed by folding a base end portion of this second folding portion into a gathering shape (fold shape) in the forward and rearward directions. That is, these first and second folding portions 51 and 52 extend from the gas introduction opening 31, respectively, in the rearward direction and in the forward direction. The adjustment accumulated portion 53 is positioned near the gas introduction opening 31 which is on the base end side of the second folding portion 52. In this state, the first folding portion 51 is formed to include a south hemisphere (the Southern Hemisphere) of the air bag main body portion 34, that is, the lower portions of the front surface portion 41 and the both side surface portions 44 and 44, and a portion of the lower surface portion 42 on the occupant A's side (the rear side) of the gas introduction opening 31. The second folding portion 52 is formed to include a north hemisphere (the Northern Hemisphere) of the air bag main body portion 34, that is, the upper portion of the front surface portion 41 including the face confronting portion 45, the upper portions of the both side surface portions 44 and 44, and the upper surface portion 43. The adjustment accumulated portion 53 is formed to include a portion of the lower surface portion 42 on a counter-occupant A's side (the front side) of the gas introduction opening 31 which is opposite to an occupant, and a portion of the both side surface portions 44 and 44 on the counter-occupant A's side (the front side). Moreover, in this state, the second folding portion 52 is formed to have a length longer than a length of the first folding portion 51 in accordance with the shape of the air bag 21. The adjustment accumulated portion 53 is formed to have a shortest length of the first folding portion 51, the second folding portion 52, and the adjustment accumulated portion 53.

Figure 2B:
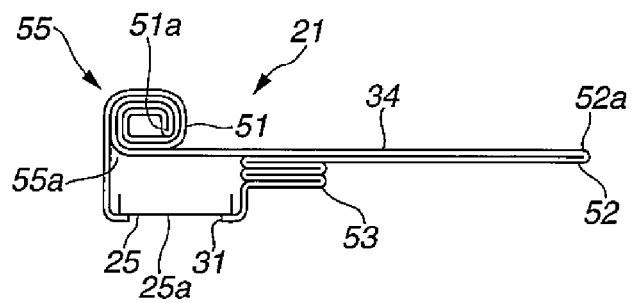

Next, in a second folding process, as shown in FIG. 2B, the first folding portion 51 is wound up (rolled up) into a rolled shape on the gas introduction opening 31's side, by employing the vehicle widthwise direction as an axial direction. That is, the first folding portion 51 is folded to invert (turn over) toward the counter-occupant A's side, so that a first accumulated portion 55 is formed above the rear portion of the retainer plate 25. In this state, the first accumulated portion 55 is positioned rearward of the gas introduction opening 31. Moreover, a first opening portion 55a into which the inflation gas G introduced from the gas introduction opening 31 flows is opened in the downward direction at the lower portion of the rear end of the first accumulated portion 55 which is positioned at the rear end of the retainer plate 25, that is, at a position apart from the gas introduction opening 31.

Figure 1:
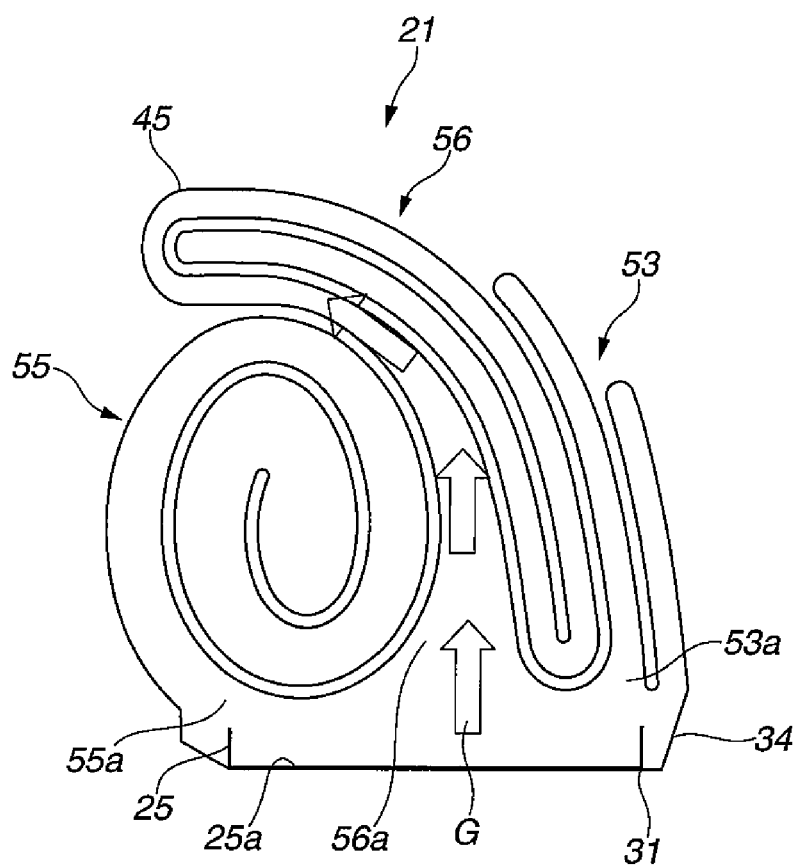
FIG. 1 is an illustrative sectional view showing a folded state of an air bag according to a first embodiment of the present invention.
Figure 2C:
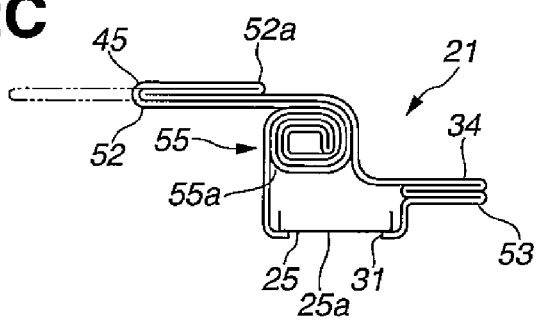
Figure 2D:
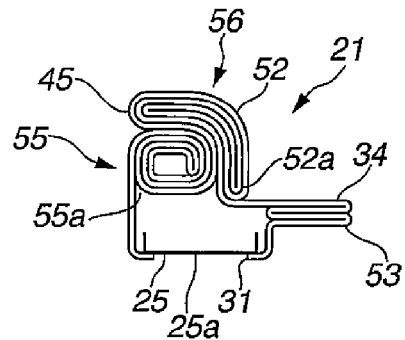

Moreover, in a third folding process, as shown in FIG. 2C, the second folding portion 52 is folded back on the occupant A's side (the rear side) to cover the upper side of the first accumulated portion 55. An end portion 52a of the second folding portion 52 which protrudes from the first accumulated portion 55 in the rearward direction is folded back (returned) on the counter-occupant A's side (the front side) at a position near a central portion of the protruding portion of the second folding portion 52 which protrudes from (beyond) the first accumulated portion 55 so that the face confronting portion 45 is positioned at the rear end portion on the first accumulated portion 55. Moreover, as shown in FIG. 2D, the second folding portion 52 is folded back at the position corresponding to the face confronting portion 45, that is, the position of the rear end of the first accumulated portion 55. With this, a second accumulated portion 56 is formed above the retainer plate 25 to extend from the upper side of the first accumulated portion 55 to the front side of the first accumulated portion 55. In this state, the second accumulated portion 56 is positioned to extend from the upper side of the gas introduction opening 31 to the front side of the gas introduction opening 31. The face confronting portion 45 is positioned to be superimposed (laid) on the upper portion (top portion) of the first accumulated portion 55. A second opening portion 56a into which the inflation gas G introduced from the gas introduction opening 31 is opened in the downward direction, and positioned directly above the gas introduction opening 31 to confront the gas introduction opening 31, as shown in FIG. 1. The second accumulated portion 56 is in a folded state where at least a portion from this second opening portion 56a to the face confronting portion 45, that is, the rear portion of the upper end is curved in the arc shape along the first accumulated portion 55 in the rearward direction without the folding points. That is, the second accumulated portion 56 becomes the folded state where the inflation gas G flows directly into the face confronting portion 45 from the gas introduction opening 31.

Figure 2E:
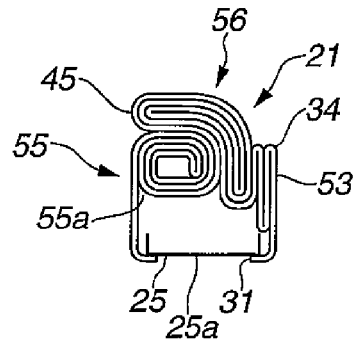

Then, in a fourth folding process, as shown in FIG. 2E, the adjustment accumulated portion 53 is folded to be placed upright so as to be closer to the second accumulated portion 56's side. With this, the air bag 21 becomes a state in which the air bag main body portion 34 is folded, as shown in FIG. 1. In this state, the adjustment accumulated portion 53 is positioned forward of the gas introduction opening 31. A third opening portion 53a into which the inflation gas G introduced from the gas introduction opening 31 flows is opened in the downward direction at the lower portion of the rear end of the adjustment accumulated portion 53 positioned at the front end of the retainer plate 25, that is, at a position apart from the gas introduction opening 31. Moreover, the first accumulated portion 55 is an occupant's stomach roll-shaped accumulated portion which is mainly contacted on a stomach B of the occupant A. The second accumulated portion 56 is an occupant's head portion accumulated portion which is mainly contacted on a head portion H of the occupant A at the deployment. The adjustment accumulated portion 53 is a portion which is mainly contacted on the instrument panel portion 14 on the front glass 15's side.

Then, the thus-folded air bag 21 is received within the case member 24 while the shape of the air bag 21 is held by an appropriate member such as breakable wrapping member.

Next, the deployment operation of the air bag 21 is illustrated.

From the state shown in FIG. 1, when the inflation gas G is supplied from the inflator 22 through the gas introduction opening 31 to the air bag 21 which is received in the folded state, the inflation gas G is directly supplied into the inside portions of the adjustment accumulated portion 53 and the first and second accumulated portions 55 and 56 of the air bag 21 which are connected to the gas introduction opening 31. In this case, the first and second accumulated portions 55 and 56, and the adjustment accumulated portion 53 can be rapidly deployed. However, in the second accumulated portion 56, the second opening portion 56a is opened to confront the upper side of the gas introduction opening 31. Accordingly, the inflation gas G directly flows into the face confronting portion 45. On the other hand, the first accumulated portion 55 is folded into the rolled shape toward the counter-occupant A's side, so that the airflow resistance becomes relatively high. Moreover, the first opening portion 55a is opened at the position apart from the gas introduction opening 31 in the rearward direction, and the second accumulated portion 56 is positioned on the first accumulated portion 55 so as to restrict the deployment of the first accumulated portion 55. In the adjustment accumulated portion 53, the third opening portion 53a is opened at the position apart from the gas introduction opening 31 in the forward direction. Accordingly, the second accumulated portion 56 is inflated and deployed prior to (in advance of) the first accumulated portion 55 and the adjustment accumulated portion 53. Consequently, when the cover member is broken by the pressure of the deployment of the air bag main body portion 34, the second accumulated portion 56 is rapidly deployed toward the front surface side, that is, the upper side, and in the rearward direction, prior to the first accumulated portion 55 and the adjustment accumulated portion 53. That is, the upper portion of the front surface portion 41 is rapidly deployed toward the upper side and in the rearward direction.

Next, the adjustment accumulated portion 53 is deployed on the forward side along the instrument panel portion 14 at a slightly later timing of the deployment of the second accumulated portion 56. Moreover, in a state where there is no restriction by the deployment of the second accumulated portion 56, the first accumulated portion 55 is deployed on the rear side in the downward direction along the instrument panel portion 14. That is, the air bag main body portion 34 is deployed in the order of the second accumulated portion 56, the adjustment accumulated portion 53, and the first accumulated portion 55, with time lag (temporal difference).

In this way, as shown in FIG. 4, the entire of the air bag 21 is deployed.

At this deployment, the second accumulated portion 56 is rapidly deployed prior to the first accumulated portion 55 and the adjustment accumulated portion 53. Accordingly, the front surface portion 41 is rapidly deployed in the vertical state to confront the occupant A seated in the normal position, so that the face confronting portion 45 confronts and contacts on the face F.

Moreover, at the above-described deployment, when the occupant A is positioned so that the chest portion C is positioned at a position (an imaginary line in FIG. 4) near the air bag apparatus 10, that is, the instrument panel portion 14, relative to the normal position, that is, in an OOP (Out of Position) state, the face confronting portion 45 of the second accumulated portion 56 which is deployed prior to the other portions confronts and contacts on the face F of the occupant A without entering below the chin of the occupant A.

Moreover, at the above-described deployment, in the OOP state in which the occupant A is positioned so that the head portion H is positioned at a position (an imaginary line L2 in FIG. 4) near the air bag apparatus 10, that is, the instrument panel portion 14, relative to the normal position, the first accumulated portion 55 is deployed along the upper portion of the head portion H of the occupant A while the first accumulated portion 55 is released in the rearward direction. With this, the air bag 21 jumps across the head portion H of the occupant A, and the air bag 21 is deployed in the upward direction without compressing the head portion H.

In this way, in this embodiment, the air bag 21 includes the first folding portion 51 and the second folding portion 52 to sandwich the gas introduction opening 31 in the forward and rearward directions crossing the thickness direction of the air bag main body portion 34. The first accumulated portion 55 is formed by folding the first folding portion 51 in a state where the first folding portion 51 is inverted toward the gas introduction opening 31's side and toward the counter-occupant A's side. The second accumulated portion 56 is formed by folding the second folding portion 52 so that the face confronting portion 45 is superimposed on and positioned on the first accumulated portion 55 so that the inflation gas G introduced from the gas introduction opening 31 directly flows into the face confronting portion 45. With this, it is possible to improve the workability of the folding operation of the air bag main body portion 34, and thereby to decrease the time period for the folding operation.

Moreover, in the folded air bag main body portion 34, the first accumulated portion 55 is folded to be inverted on the counter-occupant A's side toward the gas introduction opening 31's side. With this, the airflow resistance in the first accumulated portion 55 is relatively increased. Furthermore, in the second accumulated portion 56, the face confronting portion 45 is superposed (laid) and positioned on the first accumulated portion 55. Moreover, the second accumulated portion 56 is folded so that the folding points (folding lines) are not generated from the second opening portion 56a to the face confronting portion 45 so as to flow the inflation gas G introduced from the gas introduction opening 31, directly into the face confronting portion 45. With this, the second accumulated portion 56 is deployed prior to the first accumulated portion 55. For example, even when the chest portion C and/or the head portion H of the occupant A are deviated from (out of) the normal positions (in the state of the imaginary lines L1 and L2 of FIG. 4), it is possible to appropriately deploy the air bag main body portion 34, and to obtain the preferable deployment characteristic, irrespective of the position of the occupant A.

Moreover, in this example, the adjustment accumulated portion 53 is formed by folding the base end portion of the second accumulated portion 56. With this, it is possible to set the face confronting portion 45 in the deployment state of the air bag main body portion 34 to the appropriate position by adjusting the position of the face confronting portion 45 on the first accumulated portion 55, and to improve the freedom of the folding method.

Furthermore, even when the delay time of the inflator 22 and the layout of the passenger compartment are different, it is possible to address only by the folding of the air bag main body portion 34 by the above-described configuration of the air bag 21, without additional components.

Accordingly, it is possible to provide the low-cost air bag 21 which is devised to satisfy the injury values (injury indexes) at the normal position and the OOP of the occupant A.

Figure 5:
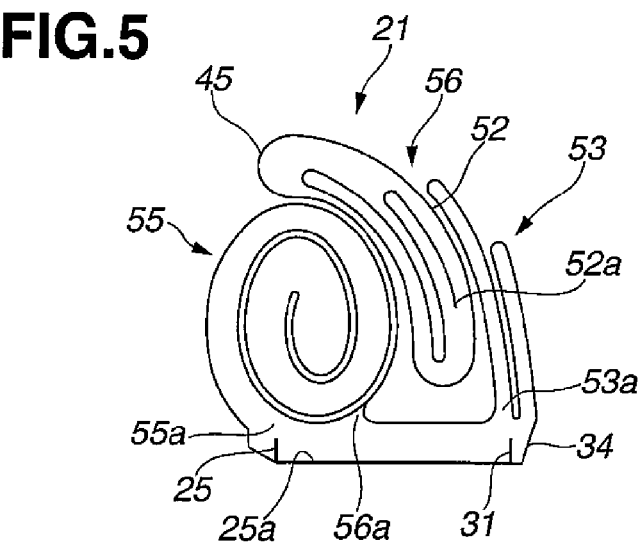
FIG. 5 is an illustrative sectional view showing an air bag according to a second embodiment of the present invention.
Figure 6:
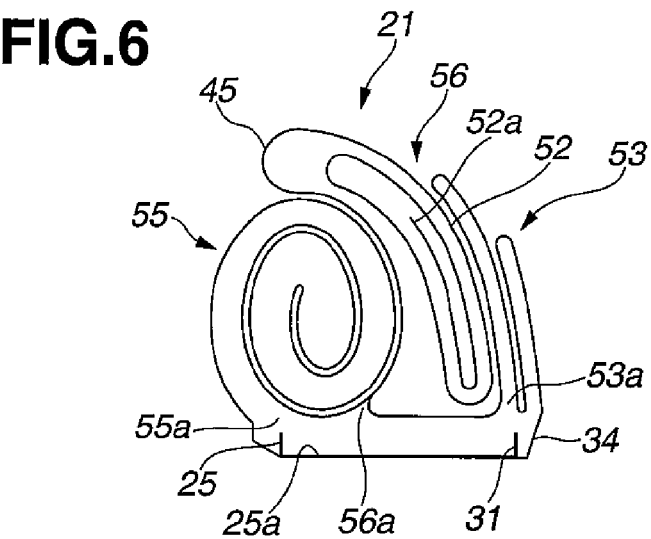
FIG. 6 is an illustrative sectional view showing an air bag according to a third embodiment of the present invention.

Besides, in the first embodiment, it is possible to employ any folding methods for the second accumulated portion 56 as long as the face confronting portion 45 is positioned on the first accumulated portion 55 so that the inflation gas G from the gas introduction opening 31 flows directly into the face confronting portion 45. In particular, for example, like a second embodiment shown in FIG. 5, the tip end portion 52a of the second folding portion 52 which is folded from the upper portion of the first accumulated portion 55 in the third folding process may be folded into a bellows shape. Moreover, for example, like a third embodiment shown in FIG. 6, the tip end portion 52a of the second folding portion 52 which is folded from the upper portion of the first accumulated portion 55 in the third folding process may be folded to be wound into a rolled shape.

Figure 7:
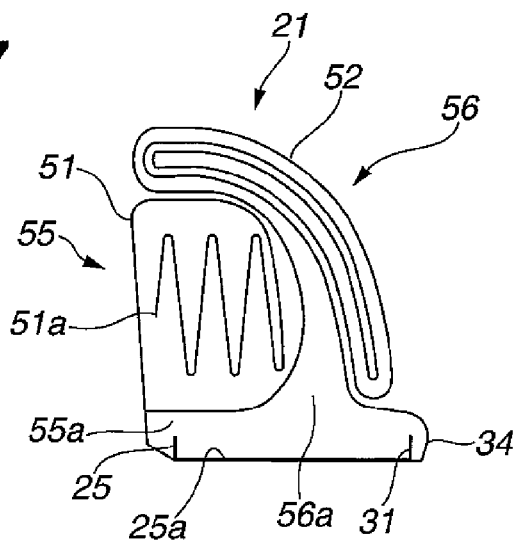
FIG. 7 is an illustrative sectional view showing an air bag according to a fourth embodiment of the present invention.
Figure 8:
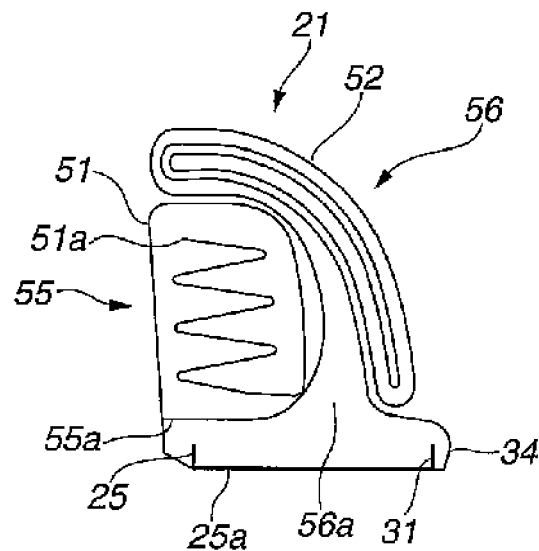
FIG. 8 is an illustrative sectional view showing an air bag according to a fifth embodiment of the present invention.
Figure 9:
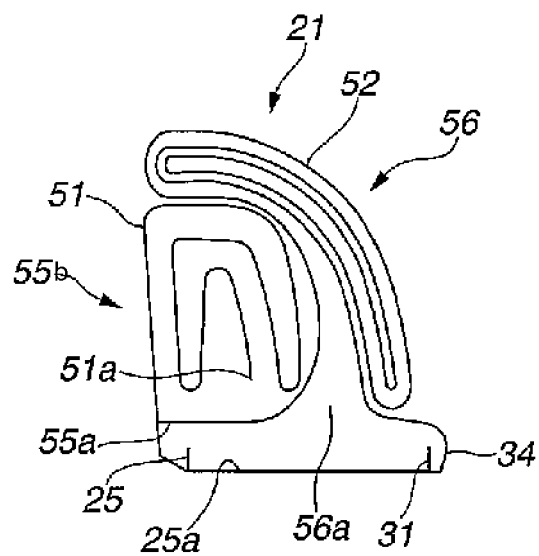
FIG. 9 is an illustrative sectional view showing an air bag according to a sixth embodiment of the present invention.

Moreover, it is possible to employ any folding methods for the first accumulated portion 55 as long as the first accumulated portion 55 is folded so that at least a part of the first accumulated portion 55 is inverted (turned over) on the counter-occupant A's side. In particular, for example, like a fourth embodiment shown in FIG. 7, the first accumulated portion 55 which has the tip end portion 51a having the bellows shape extending in the forward and rearward directions may be formed by folding the tip end portion 51a of the first folding portion 51 into the bellows shape, and then by folding to be inverted to the counter-occupant A's side. Moreover, for example, like a fifth embodiment shown in FIG. 8, the first accumulated portion 55 which has the tip end portion 51a having the bellows shape extending in the upward and downward directions may be formed by folding the tip end portion 51a of the first folding portion 51 into the bellows shape, and then by folding to be inverted to the counter-occupant A's side. Furthermore, for example, like a sixth embodiment shown in FIG. 9, the first accumulated portion 55b may be formed by folding the tip end portion 51a of the first folding portion 51 into the bellows shape, and then by folding to be inverted to the counter-occupant A's side while this tip end portion 51a is wounded (rolled) up into the rolled shape.

Figure 10:
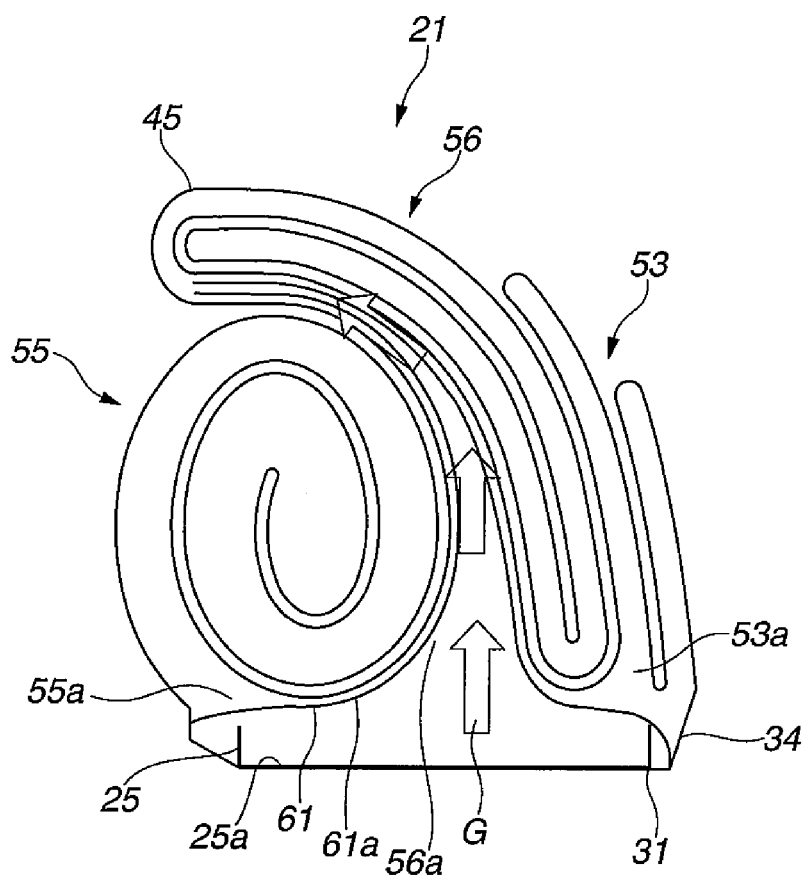
FIG. 10 is an illustrative sectional view showing an air bag according to a seventh embodiment of the present invention.

Next, an air bag according to a seventh embodiment will be illustrated with reference to FIG. 10 to FIG. 12. The air bag apparatus of FIG. 10 is substantially identical to the air bag apparatuses according to the other embodiments in most aspects as shown by the use of the same reference numerals. The illustrations of the same structure and the same operation as the above-described embodiments are omitted by providing the same reference numerals.

In the air bag 21 according to the seventh embodiment, a diffuser 61 which is a flow adjusting member (a flow adjusting fabric) is attached within the air bag 21 of the first embodiment. This diffuser 61 is referred to as an inner cylinder. This diffuser 61 is formed into a cylindrical shape by joining a base fabric 62 by sewing and so on. The diffuser 61 is provided with a deflection surface 61a positioned within the diffuser 61, and arranged to restrict (prevent) the injection gas G injected from the inflator 22 to the air bag 21 in which the air bag main body portion 34 is folded, from directly entering the first accumulated portion 55 and the adjustment accumulated portion 53, and to introduce the inflation gas G into the second accumulated portion 56. That is, the diffuser 61 is folded within the air bag main body portion 34 so that a base end portion of this diffuser 61 is fixed to the retainer plate 25, and a tip end portion of this diffuser 61 is inserted and folded into the second accumulated portion 56 in a folded state of the air bag main body portion 34 of the air bag 21. Moreover, this diffuser 61 is positioned at the second opening portion 56a confronting the upper side of the gas introduction opening 31, in the folded state of the air bag main body portion 34 of the air bag 21. The tip end portion of this diffuser 61 extends from the second opening portion 56a into the second accumulated portion 56. Moreover, the diffuser 61 shuts (closes) off the connection between the first and third opening portions 55a and 53a, and the gas introduction opening 31.

Figure 11A:
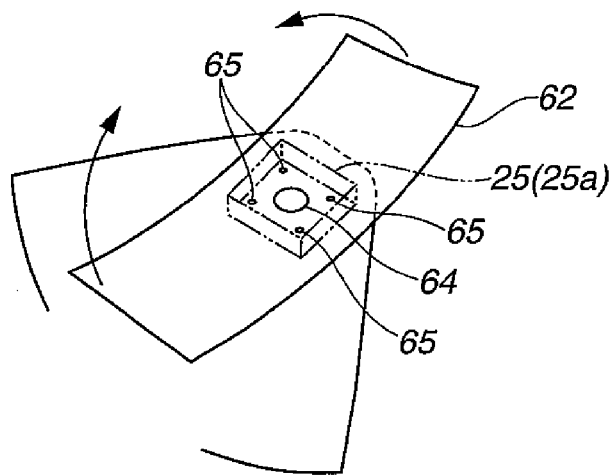
FIGS. 11A and 11B are illustrative views showing a manufacturing process of a flow adjustment member of the air bag of FIG. 10, in the order from FIG. 11A to FIG. 11B.
Figure 11B:
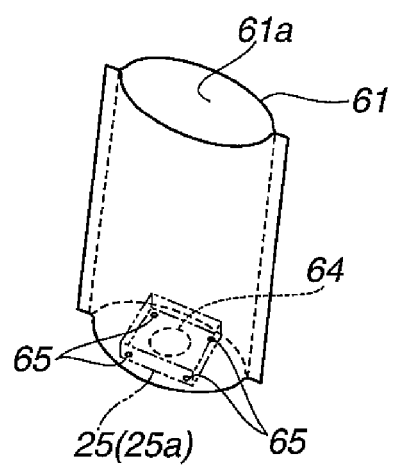
Figure 12A:
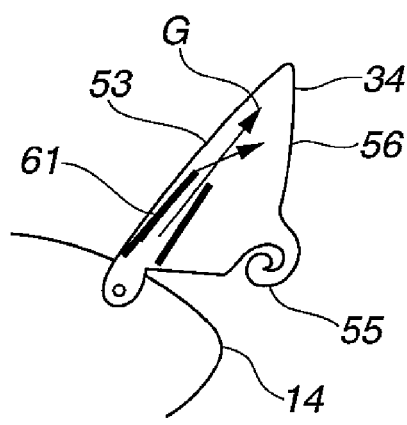
FIGS. 12A and 12B are schematically illustrative views showing the deployment of the air bag of FIG. 10, in the order from FIG. 12A to FIG. 12B.
Figure 12B:
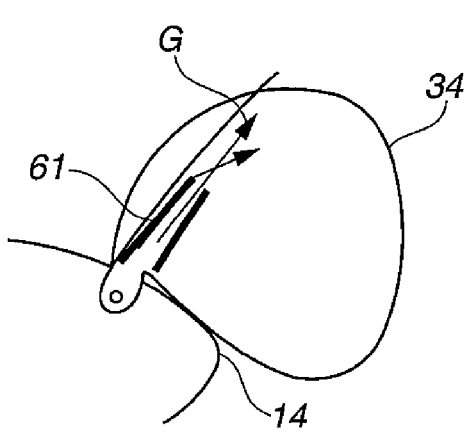

In the manufacturing process of this diffuser 61, for example, a circular connection opening 64 connected with the gas introduction opening 31 of the air bag 21 is formed at a central portion of the rectangular base fabric 62, as shown in FIGS. 11A and 11B. Moreover, through holes 65 through which the mounting bolts of the retainer plate 25 are inserted are formed around this connection opening 64. Next, the retainer main body 25a of the retainer plate 25 is inserted through the connection opening 64, and the mounting bolts are inserted through the through holes 65. Then, the base fabric 62 is folded so that longitudinal both ends of the base fabric 62 are closer to each other to wrap around the retainer main body 25a. Both side portions of the base fabric 62 are joined by the sewing and so on. Consequently, the diffuser 61 with the deflection surface 61a disposed within the diffuser 61 is finished.

The thus-finished diffuser 61 and also the retainer plate 25 are inserted within the air bag main body portion 34. The diffuser 61 is fixed integrally with this retainer plate 25 to the air bag main body portion 34 by the mounting bolts of the retainer plate 25.

When the inflation gas G is supplied from the inflator 22 through the gas introduction opening 31 into the air bag 21 within which the folded air bag main body portion 34 is received, in the air bag 21, the inflation gas G is introduced by the deflection surface 61a of the diffuser 61. Consequently, the inflation gas G is directly supplied to the inside of the second accumulated portion 56. On the other hand, the supply of the inflation gas G to the first accumulated portion 55 and the adjustment accumulated portion 53 is restricted (prevented) by the deflection surface 61a of the diffuser 61. Accordingly, the inflation gas G is adjusted and directly flowed into the face confronting portion 45 of the second accumulated portion 56, so that the second accumulated portion 56 is inflated and deployed prior to the first accumulated portion 55 and the adjustment accumulated portion 53. Consequently, when the cover member is broken by the pressure of the deployment of the air bag main body portion 34, the second accumulated portion 56 is rapidly deployed on the occupant side (the front side), that is, the upper side and in the rearward direction, prior to the first accumulated portion 55 and the adjustment accumulated portion 53.

Next, the inflation gas G intensively introduced into this second accumulated portion 56 flows into the first accumulated portion 55 and the adjustment accumulated portion 53 in accordance with the inflation and the deployment of this second accumulated portion 56. With this, the adjustment accumulated portion 53 is deployed on the forward side along the instrument panel portion 14 slightly after the second accumulated portion 56. Moreover, the first accumulated portion 55 is deployed on the rear side in the downward direction along the instrument panel portion 14 in a state where there is no restriction by the deployment of the second accumulated portion 56. That is, in the air bag main body portion 34, the second accumulated portion 56, the adjustment accumulated portion 53, and the first accumulated portion 55 are deployed in this order with a few time lag.

In this way, in this embodiment, the diffuser 61 introduces the inflation gas G into the second accumulated portion 56 while restricting (preventing) the supply of the inflation gas G into the first accumulated portion 55 (and the adjustment accumulated portion 53). With this, it is possible to surely (preferentially) inflate and deploy the second accumulated portion 56 prior to the first accumulated portion 55 (and the adjustment accumulated portion 53). Accordingly, it is possible to appropriately deploy the air bag main body portion 34, for example, even when the chest portion C and/or the head portion H of the occupant A is out of the normal positions, and thereby to obtain the preferable deployment characteristic, irrespective of the position of the occupant A.

Figure 13A:
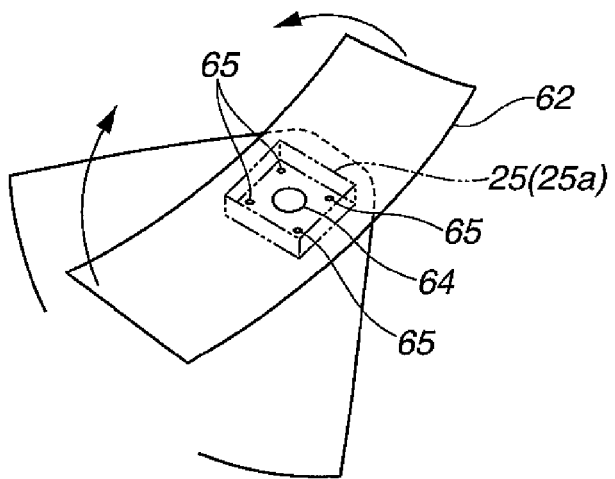
FIG. 13A to FIG. 13C are illustrative views showing a manufacturing process of a flow adjustment member of an air bag according to an eighth embodiment of the present invention, in the order from FIG. 13A to FIG. 13C.
Figure 13B:
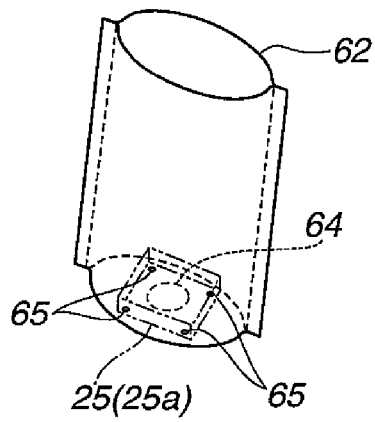
Figure 13C:
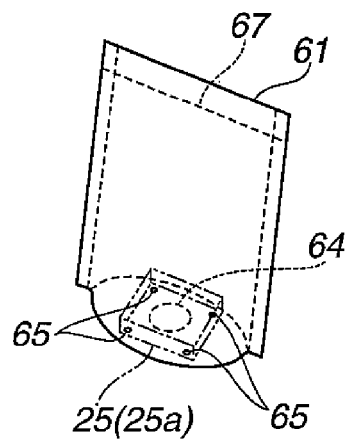

Next, an air bag according to an eighth embodiment of the present invention is illustrated with reference to FIGS. 13 and 14. Besides, the air bag of FIG. 13 is substantially identical to the air bag apparatus according to the other embodiments in most aspects as shown by the use of the same reference numerals. The illustrations of the same structure and the same operation as the above-described embodiments are omitted by providing the same reference numerals.

In this air bag 21 according to the eighth embodiment, the longitudinal both end portions of the base fabric 62 of the diffuser 61 in the seventh embodiment are basted (tacked down), so that the tip end side of the diffuser 61 is temporarily closed. That is, the tip end portion of the diffuser 61 is a receiving portion 67 which is temporarily closed. This receiving portion 67 is arranged to be broken by the pressure of the inflation gas G injected from the inflator 22.

This diffuser 61 and also the retainer plate 25 are inserted within the air bag main body portion 34. The diffuser 61 is fixed integrally with the retainer plate 25 to the air bag main body portion 34 by the mounting bolts of this retainer plate 25. Then, the flat-shaped air bag main body portion 34 is folded.

Figure 14A:
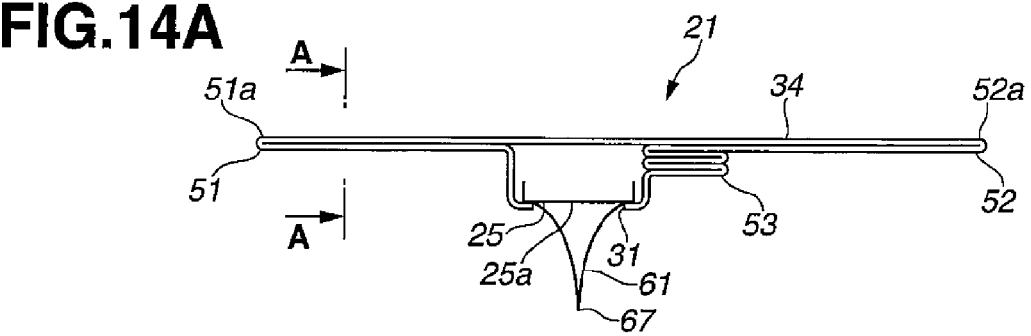
FIGS. 14A to 14E are illustrative views showing a folding process of the air bag of FIG. 13A to FIG. 13C, in the order from FIG. 14A to FIG. 14E.

Firstly, in the first folding process, as shown in FIG. 14A, the tip end portion of the diffuser 61 is pulled out from the gas introduction opening 31 to the outside of the air bag main body portion 34 (in the downward direction). Then, the substantially central portion of the front surface portion 41 is pressed toward the gas introduction opening 31's side while the both side surface portions 44 and 44 are folded inwardly, so that the air bag main body portion 34 is folded in the thickness direction. With this, there are formed the first folding portion 51 which is a rear folding portion, and the second folding portion 52 which is a front folding portion. The first folding portion 51 and the second folding portion 52 are positioned, respectively, at rear and front positions to sandwich the gas introduction opening 31. Moreover, the adjustment accumulated portion 53 which is the adjustment folding portion is formed by folding the base end portion of this second folding portion 52 into the bellows shape in the forward and rearward directions.

Figure 14B:
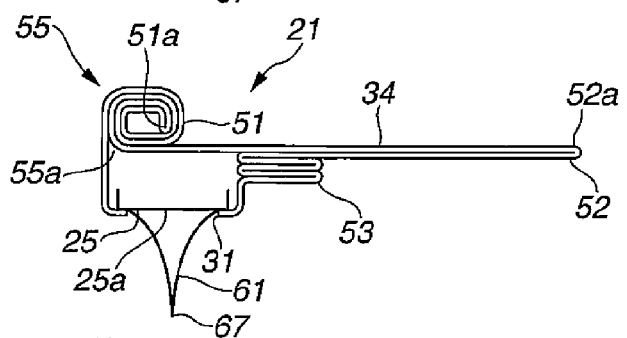

Next, in a second folding process, as shown in FIG. 14B, the first folding portion 51 is wound up into the rolled shape by employing the vehicle widthwise direction as the axial direction. That is, the first folding portion 51 is folded to be inverted (turned over) toward the counter-occupant A's side. With this, the first accumulated portion 55 is formed above the rear portion of the retainer plate 25.

Figure 14C:
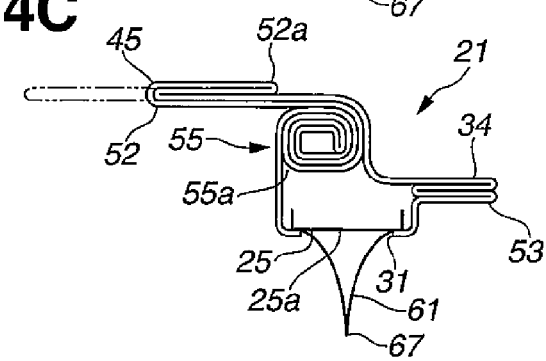
Figure 14D:
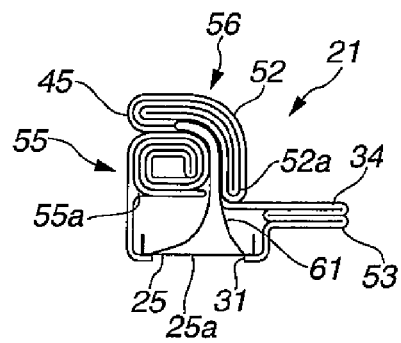

Moreover, in a third folding process, as shown in FIG. 14C, the second folding portion 52 is folded back toward the occupant A's side (the rear side) to cover the upper side of the first accumulated portion 55. The tip end portion 52a of the second folding portion 52 which protrudes from (beyond) the first accumulated portion 51 in the rearward direction is folded back at a portion near a central portion of the protruding portion of the second folding portion 52 from the first accumulated portion 55, toward the counter-occupant A's side (the forward side), so that the face confronting portion 45 is positioned at the rear end portion of the first accumulated portion 55 on the first accumulated portion 55. Moreover, as shown in FIG. 14D, the second accumulated portion 52 is folded back at a position corresponding to the face confronting portion 45, that is, the position of the rear end of the first accumulated portion 55. With this, the second accumulated portion 56 extending from the upper side of the first accumulated portion 55 to the front side of the first accumulated portion 55 is formed above the retainer plate 25. Then, an elongated insertion jig (not shown) is abutted on the receiving portion 67. The tip end portion of the diffuser 61 which was pulled out to the outside is pushed into the air bag main body portion 34 in the upward direction by the elongated insertion jig. With this, the diffuser 61 is inserted from the second opening portion 56a into the second accumulated portion 56.

Figure 14E:
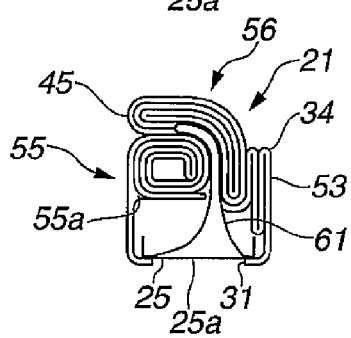

Then, in a fourth folding process, as shown in FIG. 14E, the adjustment accumulated portion 53 is folded to be placed upright so as to be closer to the second accumulated portion 56's side. The air bag main body portion 34 of the air bag 21 becomes the folded state.

Moreover, in the air bag 21 in which the air bag main body portion 34 is folded, when the inflation gas G is supplied from the inflator 22 into the gas introduction opening 31, the inflation gas G impinges on the deflection surface 61a of the diffuser 61. The receiving portion 67 is broken by the pressure of this inflation gas G. The inflation gas G is adjusted and directly introduced into the inside of the second accumulated portion 56. Moreover, the supply of the inflation gas G into the first accumulated portion 55 and the adjustment accumulated portion 53 is restricted (prevented). Since then, in the air bag main body portion 34, the second accumulated portion 56, the adjustment accumulated portion 53, and the first accumulated portion 55 are deployed in this order with the few time lag, like the seventh embodiment of the present invention.

In this way, in this example, the receiving portion 67 is formed by temporarily (provisionally) closing the tip end portion of the diffuser 61. With this, it is possible to fold the diffuser 61 into the air bag main body portion 34 while the insertion jig is abutted on the receiving portion 67. Accordingly, it is possible to further improve the manufacturability.

Figure 15A:
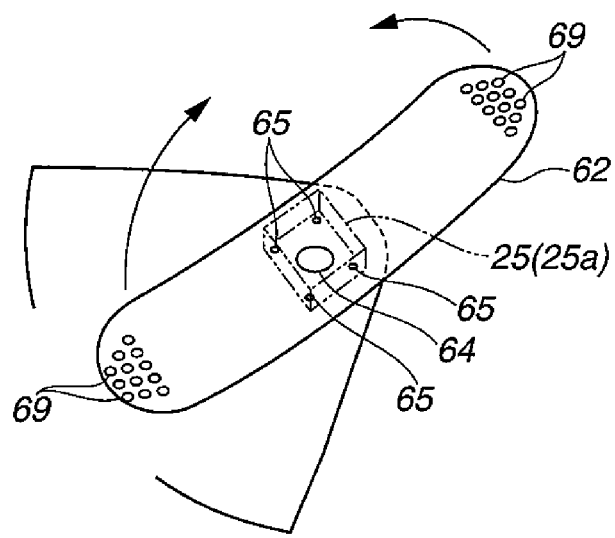
FIGS. 15A and 15B are illustrative views showing a manufacturing process a flow adjustment member of an air bag according to a ninth embodiment of the present invention, in the order from FIG. 15A to FIG. 15B.
Figure 15B:
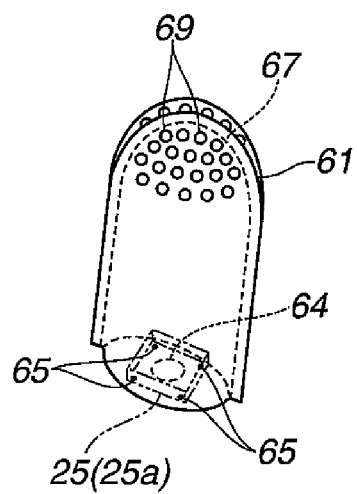

Next, an air bag apparatus according to a ninth embodiment of the present invention is illustrated with reference to FIG. 15. The air bag apparatus of FIG. 15 is substantially identical to the air bag apparatus according to the other embodiments in most aspects as shown by the use of the same reference numerals. Accordingly, the illustrations of the same structure and the same operation as the above-described embodiments are omitted by providing the same numerals.

In the air bag 21 according to the ninth embodiment of the present invention, the diffuser 61 includes a plurality of punch holes 69 each of which is a circular small hole, each of which is an air vent, and which are formed at both longitudinal end portions of the base fabric 62 of the diffuser 61. These punch holes 69 are arranged to allow passage of the inflation gas G injected from the inflator 22 into the second accumulated portion 56. The plurality of the punch holes 69 are set to have the same hole diameter to have the same opening area. The base fabric 62 of the diffuser 61 is continuously connected (in a continuous shape) from the both side portions to the longitudinal both end portions by the sewing. Accordingly, the tip end portion of the diffuser 61 is the receiving portion 67 which is closed in portions other than the punch holes 69.

In this way, in this example, the receiving portion 67 is formed at the tip end portion of the diffuser 61. With this, it is possible to readily fold the diffuser 61 into the air bag main body portion 34 by using the insertion jig, like the eighth embodiment.

Besides, the receiving portion 67 may be formed by joining, for example, a breathable net-shaped member (having aeration property) to the longitudinal both end portions of the base fabric 62, or the tip end portion of the diffuser 61, in place of the punch holes 69 in the ninth embodiment.

Figure 16:
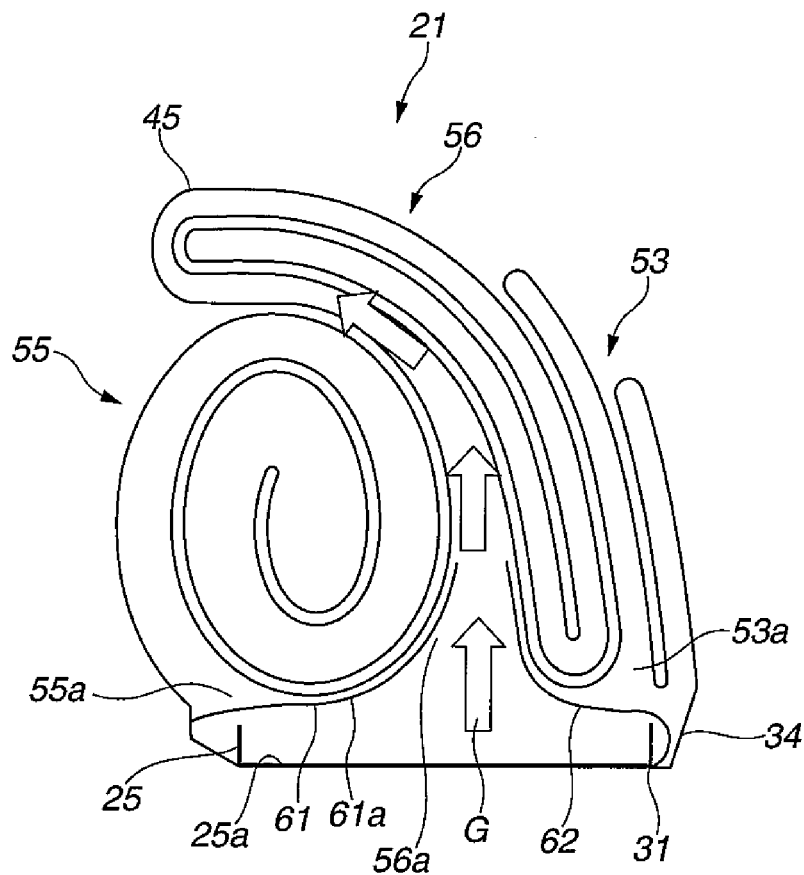
FIG. 16 is an illustrative sectional view showing a folded state of an air bag according to a tenth embodiment of the present invention
Figure 17:
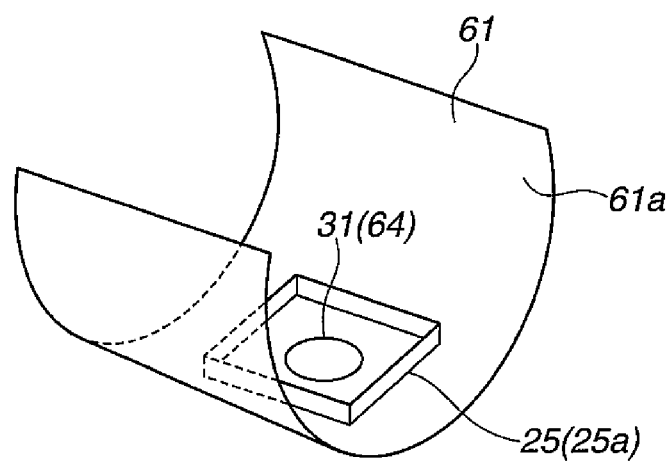
FIG. 17 is a perspective view showing a flow adjustment member of the air bag of FIG. 16.

Moreover, in the above-described seventh to ninth embodiments, the diffuser 61 may have a flap shape, like a tenth embodiment shown in FIGS. 16 and 17. That is, the longitudinal both end portions of the base fabric 62 may be positioned in a flap shape between the gas introduction opening 31 and the first and third opening portions 55a and 53a, without joining the both side portions of the base fabric 62 by the sewing. The tip end portions of the flap-shaped base fabric 62 may be inserted into the second accumulated portion 56. In this case, the inflation gas G can preferentially introduced into the second accumulated portion 56 by these both end portions. Moreover, the process of the manufacturing such as the sewing of the base fabric 62 is not needed. Accordingly, it is possible to further facilitate the manufacturing of the diffuser 61.

Figure 18:
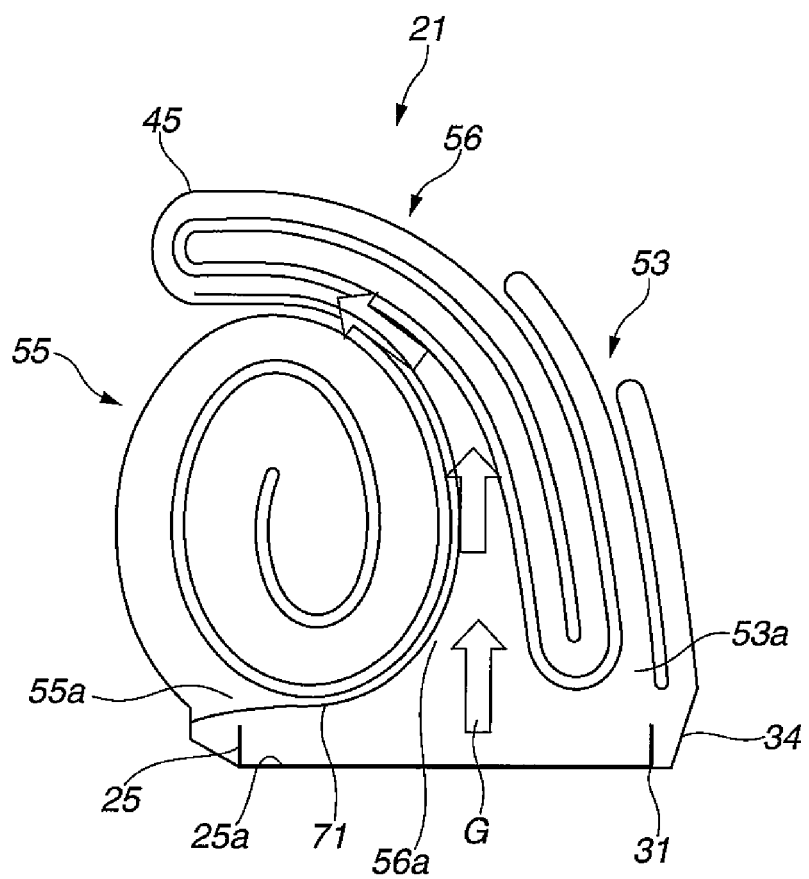
FIG. 18 is an illustrative sectional view showing a folded state of an air bag according to an eleventh embodiment of the present invention.

Moreover, for example, a flap 71 which is a flow adjusting member (a flow adjusting fabric) formed by, for example, one base fabric may be used in place of the diffuser 61 in the seventh to the tenth embodiment, like an eleventh embodiment shown in FIG. 18. This flap 71 is received integrally with the retainer plate 25 within the air bag main body portion 34. This flap 71 is positioned in a wall shape, for example, between the gas introduction opening 31 and the first opening portion 55a in the folded state of the air bag main body portion 34. The tip end portion of this flap 71 is inserted within the second accumulated portion 56. The flap 71 adjusts the flow of the inflation gas G injected from the inflator 22 and introduces the inflation gas G to the second accumulated portion 56 while restricting (preventing) the inflation gas G from directly flowing into the first accumulated portion 55. Accordingly, it is possible to attain the same effects as the seventh to the tenth embodiments of the present invention.

Moreover, the diffusers 61 in the seventh to tenth embodiments and the flap 11 in the eleventh embodiment are applicable to the second to the sixth embodiments of the present invention.

Furthermore, in the above-described embodiments, the adjustment accumulated portion 53 can be arbitrarily formed to correspond to the length of the second folding portion 52 and the position of the face confronting portion 45. When the face confronting portion 45 can be positioned at the rear upper portion of the first accumulated portion 55 merely by folding the second folding portion 52, the adjustment accumulated portion 53 needs not to be formed.

Moreover, the air bag apparatus 10 can be used as an air bag apparatus arranged to be deployed from the rear portion of the front seat toward an occupant seated in the rear seat.

The present invention is preferably used for the air bag, for example, for the passenger seat of the vehicle.

An air bag according to the embodiment of the present invention includes: a gas introduction opening portion through which an inflation gas is introduced; and a bag-shaped air bag main body portion arranged to be inflated and deployed from a folded state by the inflation gas introduced from the gas introduction opening to protect an occupant; the air bag main body portion in the folded state including a first accumulated portion folded in a state where at least a portion of the first accumulated portion is turned over on a counter-occupant side toward the gas introduction opening, and a second accumulated portion which includes a face confronting portion confronting a face of the occupant in a normal position, and which is folded in a state where the face confronting portion is superimposed on the first accumulated portion so that the inflation gas introduced from the gas introduction opening directly flows into the face confronting portion.

In the above-described air bag, the first accumulated portion is formed in a state where at least a part of the first accumulated portion is inverted (turned over) toward the counter-occupant side, so that the airflow (ventilation) resistance of the first accumulated portion is relatively increased. Moreover, the second accumulated portion is superimposed (laid) on the first accumulated portion so as to position the face confronting portion on the first accumulated portion. Furthermore, the second accumulated portion is folded so that the inflation gas introduced from the gas introduction opening flows directly into the face confronting portion. With this, the second accumulated portion is deployed prior to the first accumulated portion. Accordingly, it is possible to appropriately deploy the air bag main body portion, for example, even when the chest portion and/or the head portion of the occupant is out of the normal position, and to obtain the preferable deployment characteristic, irrespective of the position of the occupant.

In the air bag according to the embodiment of the present invention, the air bag further comprises an adjustment accumulation portion formed by folding a base end portion of the second accumulated portion, and arranged to adjust the face confronting portion at a position on the first accumulated portion.

In the above-described air bag, the adjustment accumulated portion is formed by folding the base end portion of the second accumulated portion, so that the position of the face confronting portion is adjusted to be on the first accumulated portion. With this, it is possible to readily position the face confronting portion in the deployment state of the air bag main body portion at the appropriate position, and to improve the freedom of the folding.

A folding method of an air bag including a gas introduction opening through which an inflation gas is introduced, and a bag-shaped air bag main body portion arranged to be inflated and deployed from a folded state by the inflation gas introduced from the gas introduction opening to protect an occupant, the folding method includes: forming a first folding portion and a second folding portion at positions to sandwich the gas introduction opening in a direction crossing the thickness direction, by folding the air bag main body portion in a thickness direction, forming a first accumulated portion by folding the first folding portion to turn over at least a portion of the first folding portion on a counter-occupant side toward the gas introduction opening, and forming a second accumulated portion by folding the second folding portion so that a face confronting portion confronting a face of the occupant in a normal position in the deployment state is superimposed on the first accumulated portion so that the inflation gas introduced from the gas introduction opening directly flows into the face confronting portion.

In the above-described folding method of the air bag, the first folding portion and the second folding portion are formed to sandwich the gas introduction opening in the direction crossing the thickness direction of the air bag main body portion. The first folding portion is folded in a state where at least a part of the first folding portion is inverted (turned over) toward the gas introduction opening side, that is, the counter-occupant side, so that the first accumulated portion is formed. The second folding portion is folded so that the face confronting portion confronting the face of the occupant in the normal position in the deployment state of the air bag main body portion is superimposed (laid) on the first accumulated portion so that the inflation gas introduced from the gas introduction opening flows from the gas introduction opening directly into the face confronting portion, so that the second accumulated portion is formed. With this, it is possible to improve the workability of the folding of the air bag main body portion. Moreover, the second accumulated portion can be deployed prior to the first accumulated portion. Accordingly, it is possible to appropriately deploy the air bag main body portion, for example, even when the chest portion and/or the head portion of the occupant is out of the normal position, and to obtain the preferable deployment characteristic, irrespective of the position of the occupant.

In the folding method of the air bag according to the embodiments of the present invention, the folding method further comprises forming an adjustment accumulated portion by folding a base end portion of the second folding portion when the first folding portion and the second folding portion are formed so as to adjust the position of the face confronting portion on the first accumulated portion when the second accumulated portion is formed.

In the above-described folding method of the air bag, the adjustment accumulated portion is formed by folding the base end portion of the second accumulated portion when the first folding portion and the second folding portion are formed. With this, it is possible to readily set the face confronting portion in the deployment state of the air bag main body portion at the appropriate position by adjusting the position of the face confronting portion on the first accumulated portion when the second accumulated portion is formed, and to improve the freedom of the folding.

The entire contents of Japanese Patent Application No. 2012-055333 filed Mar. 13, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air bag comprising:
   a gas introduction opening through which an inflation gas is introduced; and
   a bag-shaped air bag main body portion arranged to be inflated and deployed from a folded state by the inflation gas introduced from the gas introduction opening to protect an occupant;
   the air bag main body portion in the folded state including,
   a first accumulated portion folded in a state where at least a portion of the first accumulated portion is turned over on a counter-occupant side toward the gas introduction opening, and
   a second accumulated portion which includes a face confronting portion configured for confronting a face of the occupant in a normal position, and which is folded in a state where the face confronting portion is superimposed on the first accumulated portion, whereby:
   the inflation gas introduced from the gas introduction opening directly flows into the face confronting portion without passing through the first accumulated portion, and
   the face confronting portion while on the first accumulated portion causes a delayed inflation of the first accumulated portion;
   wherein the air bag further comprises an adjustment accumulated portion formed by folding a base end portion of the second accumulated portion, and arranged to adjust the face confronting portion at a position on the first accumulated portion, and
   wherein upon initiation of inflation, the second accumulated portion is deployed with a timing prior to the first accumulated portion and the adjustment accumulated portion.

2. The air bag as claimed in claim 1, wherein the air bag further comprises a diffuser arranged to adjust a flow of the inflation gas, and to introduce the inflation gas into the second accumulated portion while restricting the inflation gas from flowing into the first accumulated portion.

3. The air bag as claimed in claim 1, wherein upon said initiation of inflation, the adjustment accumulated portion is deployed prior to the first accumulated portion.

4. The air bag as claimed in claim 1, wherein upon said initiation of inflation, the face confronting portion is deployed toward an upper side and in a reward direction, and said adjustment accumulated portion is deployed on a forward side at a later timing than the second accumulation portion.

5. The air bag as claimed in claim 1, wherein the gas introduction opening is coupled to said first accumulated portion, said second accumulated portion and said adjustment accumulated portion by respective opening portions, whereby gas is separately supplied to each of said first accumulated portion, said second accumulated portion and said adjustment accumulated portion.

6. The air bag as claimed in claim 1, wherein said adjustment accumulated portion has multiple folds.

7. The air bag as claimed in claim 1, wherein said adjustment accumulated portion has multiple folds and is disposed only on one side of said gas introduction opening.

8. A folding method of an air bag including a gas introduction opening through which an inflation gas is introduced, and a bag-shaped air bag main body portion arranged to be inflated and deployed from a folded state by the inflation gas introduced from the gas introduction opening to protect an occupant, the folding method comprising:
   forming a first folding portion and a second folding portion at positions to sandwich the gas introduction opening in a direction crossing a thickness direction, by folding the air bag main body portion in the thickness direction,
   forming a first accumulated portion by folding the first folding portion to turn over at least a portion of the first folding portion on a counter-occupant side toward the gas introduction opening, and
   forming a second accumulated portion by folding the second folding portion so that a face confronting portion configured for confronting a face of the occupant in a normal position in a deployment state is superimposed on the first accumulated portion,
   whereby:
   the inflation gas introduced from the gas introduction opening directly flows into the face confronting portion without passing through the first accumulated portion, and
   the face confronting portion while on the first accumulated portion causes a delayed inflation of the first accumulated portion; and
   wherein the folding method further comprises forming an adjustment accumulated portion by folding a base end portion of the second folding portion when the first folding portion and the second folding portion are formed so as to adjust the position of the face confronting portion on the first accumulated portion when the second accumulated portion is formed, and wherein as a result of said folding method, upon initiation of inflation, the second accumulated portion is deployed with a timing prior to the first accumulated portion and the adjustment accumulated portion.

9. The folding method as claimed in claim 8, wherein said forming an adjustment accumulated portion comprises forming said portion with multiple folds.

* * * * *